US012709201B2

(12) United States Patent
Zhang et al.

(10) Patent No.: US 12,709,201 B2
(45) Date of Patent: Aug. 18, 2026

(54) EXTENDABLE AND RETRACTABLE MECHANISM FOR CONNECTING PLUG, AND CHILD SAFETY SEAT

(71) Applicant: WONDERLAND SWITZERLAND AG, Steinhausen (CH)

(72) Inventors: Daliang Zhang, Steinhausen (CH); Xiaolong Mo, Steinhausen (CH)

(73) Assignee: WONDERLAND SWITZERLAND AG, Steinhausen (CH)

(*) Notice: Subject to any disclaimer, the term of this patent is extended or adjusted under 35 U.S.C. 154(b) by 179 days.

(21) Appl. No.: 18/293,211

(22) PCT Filed: Aug. 5, 2022

(86) PCT No.: PCT/EP2022/072128
§ 371 (c)(1),
(2) Date: Jan. 29, 2024

(87) PCT Pub. No.: WO2023/012346
PCT Pub. Date: Feb. 9, 2023

(65) Prior Publication Data
US 2024/0278695 A1 Aug. 22, 2024

(30) Foreign Application Priority Data
Aug. 5, 2021 (CN) ......................... 202110897085.8

(51) Int. Cl.
*B60N 2/28* (2006.01)

(52) U.S. Cl.
CPC ......... *B60N 2/2824* (2013.01); *B60N 2/2893* (2013.01)

(58) Field of Classification Search
CPC .. B60N 2/2824; B60N 2/2893; B60N 2/2821; B60N 2/2887; Y10T 403/32483; Y10T 403/32508
See application file for complete search history.

(56) References Cited

U.S. PATENT DOCUMENTS 3,144,945 A * 8/1964 Seiz ..................... A47B 57/485 403/108
9,357,840 B2 * 6/2016 Davis ..................... A47B 91/00
(Continued)

FOREIGN PATENT DOCUMENTS

CN 201566524 U 9/2010
CN 104859495 A 8/2015
(Continued)

OTHER PUBLICATIONS

Office Action in Corresponding Japanese Application No. 2024-506257, dated Apr. 30, 2025; 10 pgs.
(Continued)

*Primary Examiner* — Magdalena Topolski
*Assistant Examiner* — Shanna Danielle Glover
(74) *Attorney, Agent, or Firm* — HAUPTMAN HAM, LLP

(57) ABSTRACT

An extendable and retractable mechanism of a connecting plug and a child safety seat. The extendable and retractable mechanism of the connecting plug includes a plug connecting rack and a locking pin. The plug connecting rack is arranged slidably back and forth on a base of the child safety seat. The plug connecting rack includes a plurality of first adjusting concave portions, and the plurality of the first adjusting concave portions are arranged in sequence along a sliding direction of the plug connecting rack. The locking pin is movably supported to allow the locking pin to be kept in a first locking state that a first end of the locking pin extends into any one of the plurality of the first adjusting concave portions. The first end of the locking pin has a slope, and the slope faces rearwards.

14 Claims, 8 Drawing Sheets

(56) References Cited

U.S. PATENT DOCUMENTS

| | | | |
|---|---|---|---|
| 2005/0103968 | A1 | 5/2005 | Yamada et al. |
| 2016/0029786 | A1 | 2/2016 | Davis |
| 2020/0398711 | A1 | 12/2020 | Fu |

FOREIGN PATENT DOCUMENTS

| | | | | | |
|---|---|---|---|---|---|
| CN | 107813736 | A | | 3/2018 | |
| CN | 207725264 | U | | 8/2018 | |
| CN | 110015218 | A | | 7/2019 | |
| CN | 113043925 | A | | 6/2021 | |
| GB | 2523461 | A | | 8/2015 | |
| JP | 2020019338 | A | | 2/2020 | |
| KR | 101570000 | B1 | | 11/2015 | |
| KR | 20180029767 | A | * | 3/2018 | ........... B60N 2/2893 |
| KR | 1020180029767 | A | | 3/2018 | |
| WO | 2018/054249 | A1 | | 3/2018 | |

OTHER PUBLICATIONS

International Search Report issued in corresponding International Application No. PCT/EP2022/072128, dated Mar. 6, 2023, pp. 1-5, European Patent Office, Rijswijk, Netherlands.

Written Opinion issued in corresponding International Application No. PCT/EP2022/072128, dated Mar. 6, 2023, pp. 1-10, European Patent Office, Rijswijk, Netherlands.

Taiwan Office Action issued in corresponding Taiwan Application No. 111129543, dated Jul. 7, 2023, pp. 1-6.

First Office Action issued in Chinese Patent Application No. 202110897085.8; mailed Dec. 25, 2025; 13 pages.

* cited by examiner

EXTENDABLE AND RETRACTABLE MECHANISM FOR CONNECTING PLUG, AND CHILD SAFETY SEAT

CROSS-REFERENCE OF RELATED APPLICATION

This application is U.S. National Stage of International Application No. PCT/EP2022/072128, filed on Aug. 5, 2022, which claims the priority of Chinese patent application 202110897085.8, filed on Aug. 5, 2021, and entitled "EXTENDABLE AND RETRACTABLE MECHANISM FOR CONNECTING PLUG, AND CHILD SAFETY SEAT", the entire content of which is incorporated herein by reference.

TECHNICAL FIELD

The present disclosure relates to an extendable and retractable mechanism for a connecting plug and a child safety seat.

BACKGROUND

A current child safety seat generally adopts an ISOFIX connecting plug detachably connected to an ISOFIX socket on a vehicle seat. Such a connection manner not only provides convenience for disassembly and assembly of the child safety seat, but also ensures that the child safety seat is stably and reliably supported on the vehicle seat. In order to make the ISOFIX connecting plug of the child safety seat adaptable to ISOFIX sockets on different vehicles, the ISOFIX connecting plug in the related art is installed on a base of the child safety seat in an extendable and retractable adjustment manner through an extendable and retractable mechanism.

FIG. 1 shows a typical extendable and retractable mechanism, which includes a plug connecting rack 2' and a locking pin 3'. The plug connecting rack 2' may be arranged slidably back and forth on the base of the child safety seat (not shown in the drawings), and the rear end of the plug connecting rack 2' is configured to be connected to the ISOFIX connecting plug (not shown in the drawings). On the plug connecting rack 2', a plurality of holes 20' are arranged in sequence along the front-to-rear direction. The locking pin 3' is elastically supported by the spring 35' and may be extendable and retractable in a direction perpendicular to a sliding direction of the plug connecting rack 2'. The spring 35' is configured to keep a first end 31' of the locking pin 3' in a locking state of extending into any hole 20'. When the position of the ISOFIX connecting plug needs to be adjusted, the unlocking mechanism firstly makes the locking pin 3' to be kept in an unlocking state (the state shown in FIG. 1) that the first end 31' retracts from the hole 20'. After the plug connecting rack 2' is adjusted to a proper position, the unlocking mechanism is released from controlling the locking pin 3', and the spring 35' may automatically push the first end 31' of the locking pin 3' into a corresponding hole 20', thereby fixing the ISOFIX connecting plug in a proper position. When the position of the ISOFIX connecting plug needs to be adjusted, such an extendable and retractable mechanism needs to be operated by an unlocking mechanism to make the locking pin 3' retract from the hole 20' and not interfere with the movement of the plug connecting rack 2'.

SUMMARY

The objective of the present disclosure is to provide an extendable and retractable mechanism for a connecting plug to facilitate a position adjustment of the connecting plug relative to the base of the child safety seat. The present disclosure also provides a child safety seat to which the extendable and retractable mechanism for the connecting plug is applied.

In one aspect, the present disclosure provides an extendable and retractable mechanism for a connecting plug, including a plug connecting rack and a locking pin. The plug connecting rack is arranged slidably back and forth on a base of a child safety seat. The plug connecting rack includes a plurality of first adjusting concave portions. The plurality of first adjusting concave portions are arranged in sequence along a sliding direction of the plug connecting rack. The locking pin is movably supported to allow the locking pin to be kept in a first locking state that a first end of the locking pin extends into any one of the plurality of the first adjusting concave portions. The first end of the locking pin has a slope, and the slope facing rearwards. When the locking pin is in the first locking state, the slope is in contact with an edge of the any one of the plurality of the first adjusting concave portions.

Further, each of the plurality of the first adjusting concave portions has a straight edge configured to be in contact with the slope.

Further, the first end of the locking pin further includes a locking slot backing onto the slope. The plug connecting rack is a tube. When the locking pin is in the first locking state, part of tube wall located at the first adjusting concave portion of the plug connecting rack is locked in the locking slot.

Further, the plug connecting rack further includes at least one second adjusting concave portion. The at least one second adjusting concave portion is located in front of the plurality of the first adjusting concave portions. The locking pin has a second locking state that the first end of the locking pin extends into the second adjusting concave portion. When the locking pin is in the second locking state, the locking pin is configured to prevent the plug connecting rack from extending and moving rearwards, and from retracting and moving forwards relative to the base.

Further, the plug connecting rack is further provided with at least one first blocking portion corresponding to the at least one second adjusting concave portion. The locking pin includes a lock tongue and a cylindrical portion connected to each other. The lock tongue is arranged at the first end of the locking pin. The slope is formed on the lock tongue. The cylindrical portion is adaptable to cooperate with the first blocking portion to prevent the plug connecting rack from retracting and moving forwards relative to the base.

Further, the first blocking portion is a first protrusion formed at an edge of the second adjusting concave portion.

Further, the plug connecting rack is a tube. The second adjusting concave portion is configured such that when the locking pin is in the second locking state, the slope passes through the second adjusting concave portion and extends to an inside of the plug connecting rack, and is separated from an edge of the second adjusting concave portion.

Further, the plug connecting rack further includes at least one third adjusting concave portion. The at least one third adjusting concave portion is located behind the plurality of first adjusting concave portions. The locking pin has a third locking state that the first end of the locking pin extends into the third adjusting concave portion. When the locking pin is in the third locking state, the locking pin is configured to prevent the plug connecting rack from extending and moving rearwards, and from retracting and moving forwards relative to the base.

Further, the plug connecting rack is further provided with at least one second blocking portion corresponding to the at least one third adjusting concave portion. The locking pin includes a lock tongue and a cylindrical portion connected to each other. The lock tongue is arranged at the first end of the locking pin. The slope is formed on the lock tongue. The cylindrical portion is adaptable to cooperate with the second blocking portion to prevent the plug connecting rack from retracting and moving forwards relative to the base.

Further, the second blocking portion is a second protrusion formed at an edge of the third adjusting concave portion.

Further, the first adjusting concave portion is a hole or a slot, or a connecting plug is installed at a rear end of the plug connecting rack.

On another aspect, the present disclosure provides a child safety seat, including a base, the extendable and retractable mechanism for the connecting plug above, and an unlocking mechanism configured to drive the locking pin to urge the first end of the locking pin to retract from any one of the plurality of the first adjusting concave portions.

Further, the unlocking mechanism includes a swing rod, a pull handle, a resetting member, and an operating member. The swing rod includes a first arm, a second arm, and a first corner portion arranged between the first arm and the second arm. A free end of the first arm and the locking pin are hinged. The first corner portion and the base are hinged. A free end of the second arm and a rear end of the pull handle are hinged. A front end of the pull handle is operably connected to the operating member. The operating member is adaptable to pull the pull handle to urge the swing rod to drive the first end of the locking pin to retract from the any one of the plurality of adjusting concave portions. The resetting member is configured to urge the pull handle to reset, and configured to urge the locking pin to reset to the first locking state.

Further, the free end of the first arm is provided with an elongated hole, and an intermediate section of the locking pin is provided with a through hole. A connecting bolt extends into the rectangle-shaped hole and the through hole to hinge the first arm with the locking pin.

In the extendable and retractable mechanism provided by the embodiment of the present disclosure, the slope is defined at the first end of the locking pin, and the slope faces rearwards and is adaptable to be in contact with the edge of the first adjusting concave portion, thereby realizing a one-way restriction on the rearward extension of the plug connecting rack. When the child safety seat is installed on the vehicle seat, the exposed length L of the ISOFIX plug usually needs to be shortened to make the child safety seat to tightly press against the vehicle seat. When the child safety seat, to which the extendable and retractable mechanism for the connecting plug is applied, is installed on the vehicle seat, and when the first end of the locking pin extends into the first adjusting concave portion, the exposed length of the connecting plug may be easily shortened by pushing the base rearwards, without having to operate the unlocking mechanism, thereby making the child safety seat tightly press against the vehicle seat, which greatly simplifies the operation of the position adjustment of the connecting plug. When the child safety seat is detached from the vehicle, and the connecting plug is in an extending state, and the first end of the locking pin is inserted in the first adjusting concave portion, there is no need to operate the unlocking mechanism, and the connecting plug may easily retract into the base by pushing the connecting plug forwards, which helps to reduce a packaging volume of the child safety seat and facilitates storage and transportation of the child safety seat.

REFERENCE SIGNS

1. base; 2, 2'. plug connecting rack; 3, 3'. locking pin; 3*a*. lock tongue; 3*b*. cylindrical portion;
5. unlocking mechanism; 6. operating member; 11. load leg;
20. adjusting concave portion; 20*a*. first adjusting concave portion; 20*b*. second adjusting concave portion; 20*c*. third adjusting concave portion; 20'. Hole; 21. connecting plug;
23. first blocking portion; 25. second blocking portion;
31, 31'. first end; 32. second end; 35, 35'. spring;
51. swing rod; 52. pull handle; 6. operating member; 61. connecting bolt; 62, 63. pin shaft;
100. retractable mechanism; 110. decorative cover; 201. straight edge;
301. slope; 302. locking slot; 303. through hole; 304. projecting edge;
511. first arm; 512. second arm; 513. first corner portion; 5110. elongated hole;
F, R, V. arrow; L. length; X1. first axial dimension; X2. second axial dimension

DETAILED DESCRIPTION OF THE EMBODIMENTS

Figure 1:
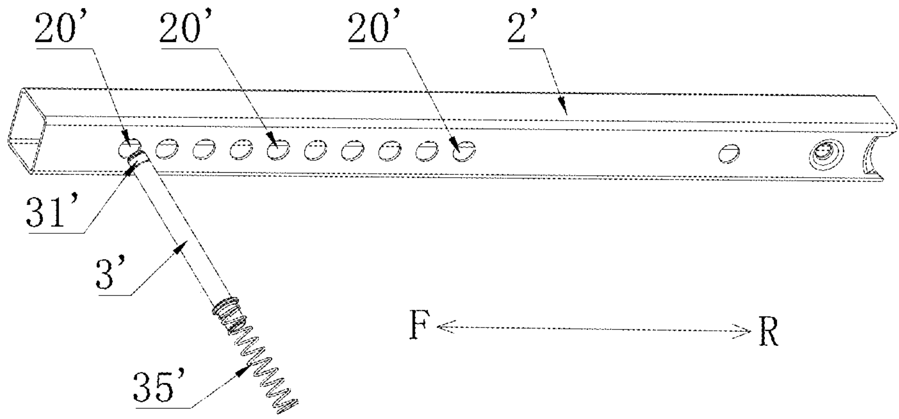
FIG. 1 schematically illustrates a perspective view of an extendable and retractable mechanism in the related art, where, a locking pin is in an unlocking state.
Figure 2:
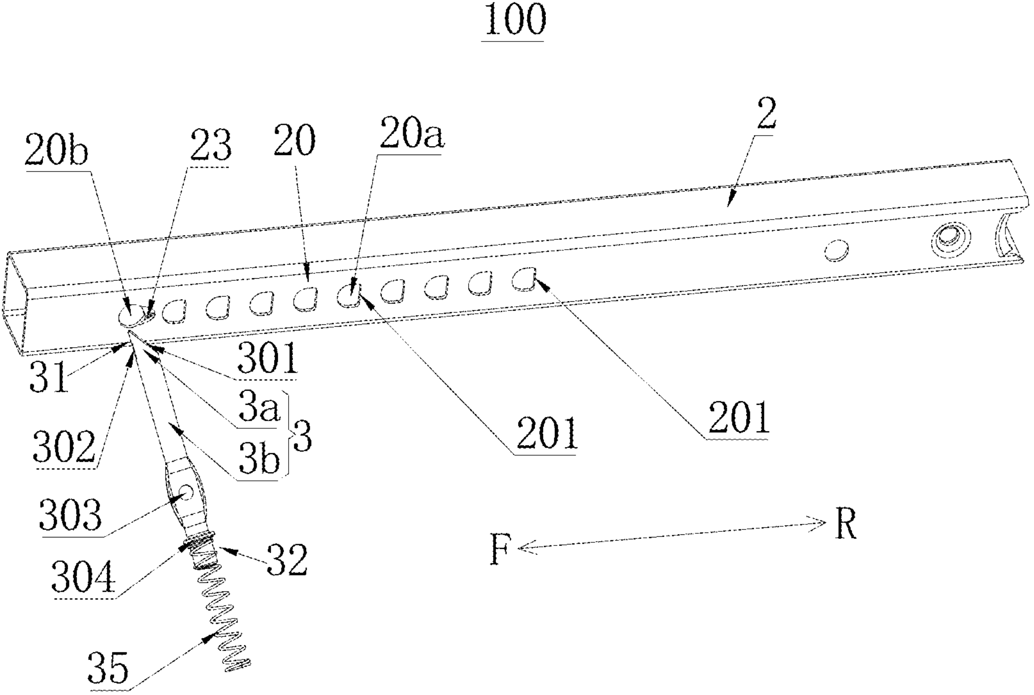
FIG. 2 schematically illustrates a perspective view of an extendable and retractable mechanism for a connecting plug according to an embodiment of the present disclosure, where, the locking pin is in the unlocking state.

FIG. 2 illustrates a perspective view of an extendable and retractable mechanism 100 of a connecting plug (also referred to as an extendable and retractable mechanism hereinafter) according to an embodiment of the present disclosure, and the extendable and retractable mechanism 100 includes a plug connecting rack 2 and a locking pin 3. Referring to FIG. 2 to FIG. 6, the plug connecting rack 2 is arranged slidably back and forth on a base 1 of a child safety seat, and the locking pin 3 is configured to lock the plug connecting rack 2. The connection manner between the plug connecting rack 2 and the base 1 may refer to the prior art. A load leg 11 is installed on a front end of the base 1, and a lower end of the load leg 11 is configured to abut against the floor of the vehicle. A rear end of the plug connecting rack 2 is configured to allow the connecting plug 21 to be installed thereon, and the connecting plug 21 is, for example, an ISOFIX plug or any other adaptable plug. It should be noted that, unless otherwise specified, the orientation terms such as "front" and "rear" in the embodiments of the present disclosure are based on the directions shown in the drawings, and arrows F and R in each of the drawings indicate a forward direction and a rearward direction, respectively. These orientation terms are only used to make the description of the embodiments of the present disclosure clearer, but are not intended to limit the protection scope of the present disclosure improperly.

Referring to FIG. 2, the plug connecting rack 2 includes a plurality of adjusting concave portions 20. The plurality of adjusting concave portions 20 are arranged in sequence along a sliding direction (i.e., a front-to-rear direction) of the plug connecting rack 2. In FIG. 2, the adjusting concave portion 20 disposed at the front end is a second adjusting concave portion and denoted, for example, by a numeral 20*b*, and one or more adjusting concave portions 20 located behind the second adjusting concave portion 20*b* are first adjusting concave portions and denoted, for example, by a numeral 20*a*. Each adjusting concave portion 20 is, for example, a hole. In an alternative embodiment, each adjusting concave portion 20 is, for example, a slot. The number of the first adjusting concave portion 20*a* and the number of the second adjusting concave portion 20*b* are set according to actual needs.

Figure 5:
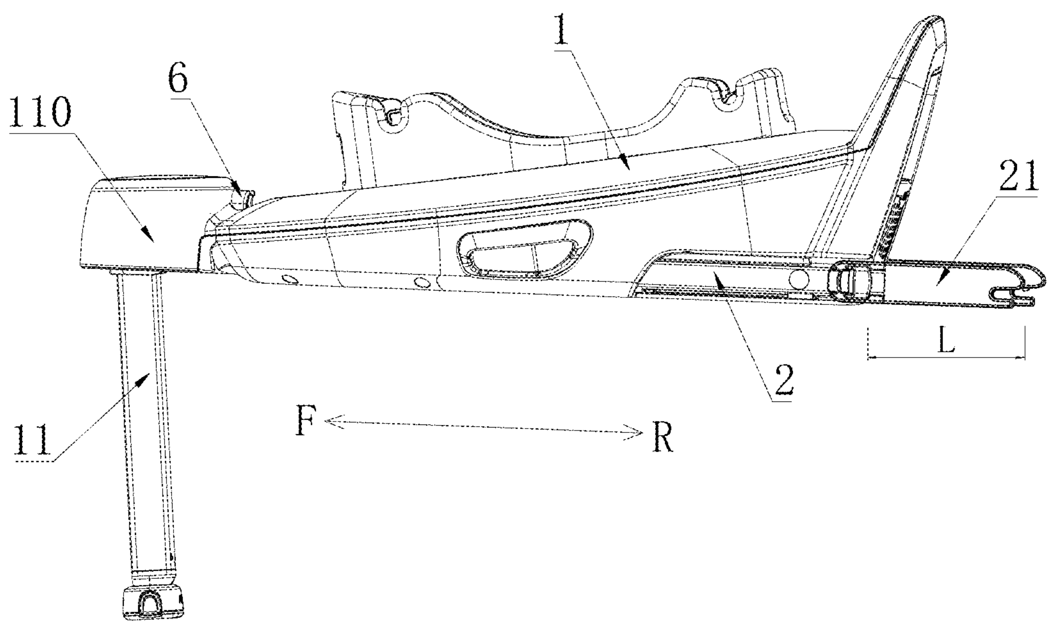
FIG. 5 schematically illustrates a side view of partial structure of the child safety seat according to an embodiment of the present disclosure, where, the connecting plug extends rearwards relative to a base.
Figure 6:
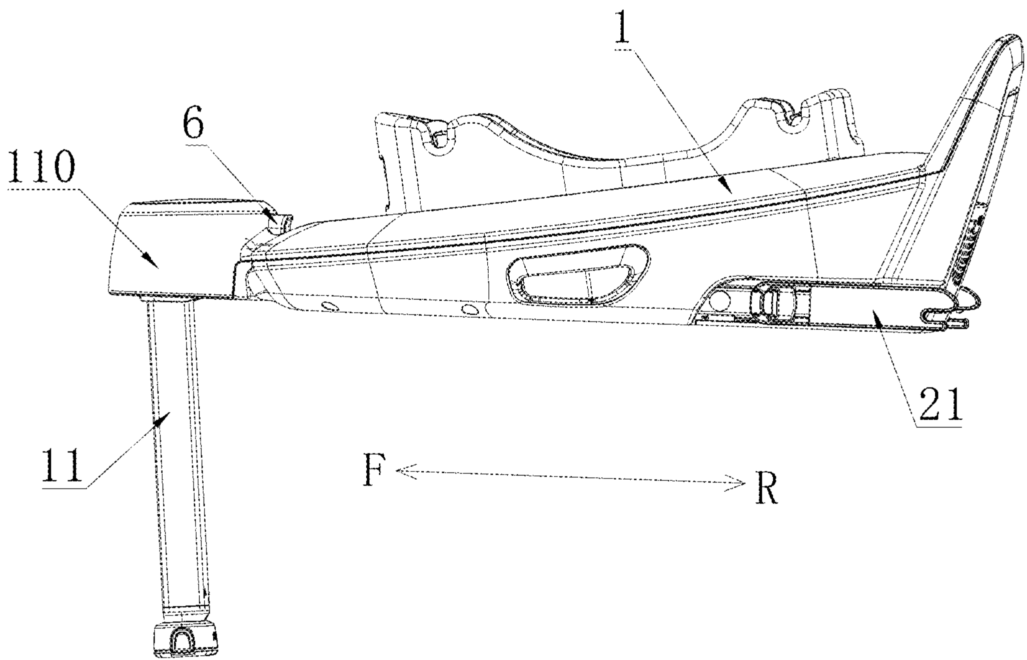
FIG. 6 schematically illustrates a side view of partial structure of the child safety seat according to an embodiment of the present disclosure, where, the connecting plug retracts forward relative to the base.

The locking pin 3 is movably supported to allow the locking pin 3 to be kept in the locking state that the first end 31 thereof extends into the adjusting concave portion 20. The locking pin 3 is configured to be extendable and retractable in an axial direction. The axial direction of the locking pin 3 is substantially perpendicular to the sliding direction of the plug connecting rack 2, so as to allow the first end 31 of the locking pin 3 to extend into any adjusting concave portion 20 (namely, the locking pin 3 switches from the unlocking state to the locking state), or to retract from any adjusting concave portion 20 (namely, the locking pin 3 switches from the locking state to the unlocking state). For example, in some embodiments, a projecting edge 304 is provided proximate to a second end 32 of the locking pin 3. One end of the spring 35 is sleeved on the second end of the locking pin 3 and restricted by the projecting edge 304, and the other end of the spring 35 is restricted, for example, by any other suitable structure on the base 1. The axial movement of the locking pin 3 may be guided by any suitable structure, thus the spring 35 keeps the locking pin 3 in the locking state, and under a force, the locking pin 3 may compress the spring 35 to switch to the unlocking state. Referring to FIG. 5, when the locking pin 3 is in the locking state, the cooperation between the first end 31 of the locking pin 3 and the adjusting concave portion 20 may prevent the plug connecting rack 2 from extending rearwards relative to the base 1. At this time, if the ISOFIX plug is pulled rearwards directly, an exposed length L of the ISOFIX plug relative to the base 1 does not change.

Figure 3:
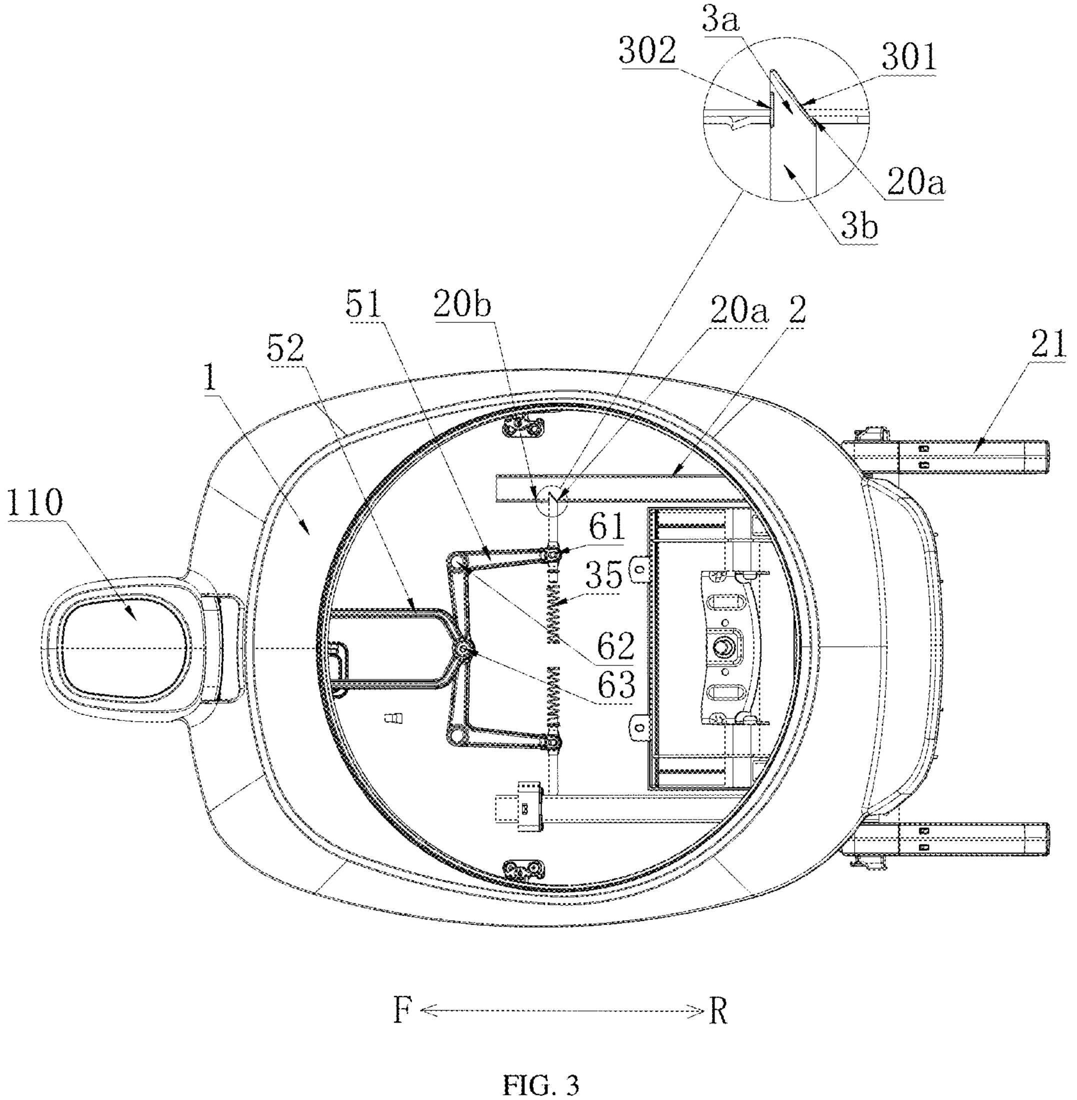
FIG. 3 schematically illustrates a top sectional view of partial structure of a child safety seat according to an embodiment of the present disclosure, to which the extendable and retractable mechanism for the connecting plug shown in FIG. 2 is applied, where, the locking pin is in a locking state and a first end thereof is inserted into a first adjusting concave portion.

Referring to FIGS. 2, 3, and 5, the first end 31 of the locking pin 3 has a slope 301. The slope 301 faces rearwards and is adaptable to be in contact with the edge of the first adjusting concave portion 20*a*, such that when the plug connecting rack 2 is pushed forwards, or when the base 1 is pushed rearwards, the edge of the first adjusting concave portion 20*a* presses against the slope 301 to exert a stress on the first end 31 of the locking pin 3. Under the stress, the first end 31 of the locking pin 3 presses the spring 35 and retracts from the first adjusting concave portion 20*a*, thereby allowing the plug connecting rack 2 to retract and move forwards relative to the base 1. At this time, the ISOFIX plug may retract towards the bottom of the base 1, and the exposed length L of the ISOFIX plug relative to the base 1 becomes shorter. In some embodiments, the locking pin 3 includes a lock tongue 3*a* and a cylindrical portion 3*b* connected to each other. The lock tongue 3*a* is arranged at the first end 31 of the locking pin 3, and the slope 301 is formed on the lock tongue 3*a*.

When the child safety seat is being installed on the vehicle seat, firstly the ISOFIX plug engages with the ISOFIX socket on the vehicle seat, and then the front and the rear positions of the ISOFIX plug are adjusted, and then a backrest of the child safety seat tightly presses against a backrest of the vehicle seat, and the load leg 11 tightly presses against the floor of the vehicle. When adjusting the front and the rear positions of the ISOFIX plug (extending rearwards or retracting forwards), the extendable and retractable mechanism in the prior art needs to be operated by an unlocking mechanism to keep the locking pin in the unlocking state. After the ISOFIX plug moves to a proper position, the control of the unlocking mechanism over the locking pin is released, and the operation of position adjustment of the ISOFIX plug is relatively inconvenient.

In the extendable and retractable mechanism provided by the embodiment of the present disclosure, the slope 301 is defined at the first end 31 of the locking pin 3, and the slope 301 is adaptable to be in contact with the edge of the first adjusting concave portion 20*a*. When the first end 31 of the locking pin 3 is inserted into the first adjusting concave portion 20*a*, the locking pin 3 may realize a one-way restriction on the rearward extension of the plug connecting rack 2, that is, the plug connecting rack 2 is allowed to carry the ISOFIX plug to automatically retract forwards relative to the base 1 to shorten the exposed length L of the ISOFIX plug, but not allowed to carry the ISOFIX plug to automatically extend rearwards relative to the base 1 to lengthen the exposed length L of the ISOFIX plug. For the extendable and retractable mechanism of the embodiment of the present disclosure, when the exposed length L of the ISOFIX plug needs to be lengthened, the unlocking mechanism still needs to be operated to keep the locking pin 3 in the unlocking state.

When the child safety seat is installed on the vehicle seat, the exposed length L of the ISOFIX plug usually needs to be shortened to make the child safety seat to tightly press against the vehicle seat. When the child safety seat is installed in place, the exposed length L of the ISOFIX plug cannot be lengthened at will. For the extendable and retractable mechanism provided by the embodiment of the present disclosure, after the child safety seat is installed on the vehicle seat, and when the first end 31 of the locking pin 3 extends into the first adjusting concave portion 20*a* (namely, when the locking pin 3 is in a first locking state), as shown in FIG. 5, the exposed length L of the ISOFIX plug may be easily shortened by pushing the base 1 rearwards (e.g., pushing a decorative cover 110 over the load leg 11), without having to operate the unlocking mechanism, thereby making the child safety seat tightly press against the vehicle seat, which greatly simplifies the operation of the position adjustment of the ISOFIX plug. When the child safety seat is detached from the vehicle, and the ISOFIX plug is, for example, in an extending state shown in FIG. 5, and if the first end 31 of the locking pin 3 is inserted in the first adjusting concave portion 20*a*, there is no need to operate the unlocking mechanism, and the ISOFIX plug may easily retracts into the base 1 (referring to FIG. 6) by pushing the ISOFIX plug forwards, which helps to reduce a packaging volume of the child safety seat and facilitates storage and transportation of the child safety seat.

Referring to FIG. 2, all or part of the adjusting concave portions 20 each may have a straight edge 201 configured to be in contact with the slope 301. For example, each first adjusting concave portion 20*a* is provided with the straight edge 201. Through the straight edge 201 being in contact with the slope 301, the force may be exerted on the first end 31 of the locking pin 3 directly, which makes it more convenient for the plug connecting rack 2 to retract forwards relative to the base 1.

In some embodiments, the first end 31 of the locking pin 3 further includes a locking slot 302 backing onto the slope 301. The plug connecting rack 2 is a tube. When the locking pin 3 is in the locking state, part of tube wall located at the adjusting concave portion 20 of the plug connecting rack 2 is locked in the locking slot 302, thereby further improving the ability to restrict the rearward extension of the plug connecting rack 2 relative to the base 1. A transition between the edge of the locking slot 302 and the peripheral surface of the locking pin 3 is realized by means of an arc surface or a tapered surface, so as not to affect the axial movement of the first end 31 of the locking pin 3 when the first end 31 of the locking pin 3 needs to retract from any adjusting concave portion 20.

Figure 4:
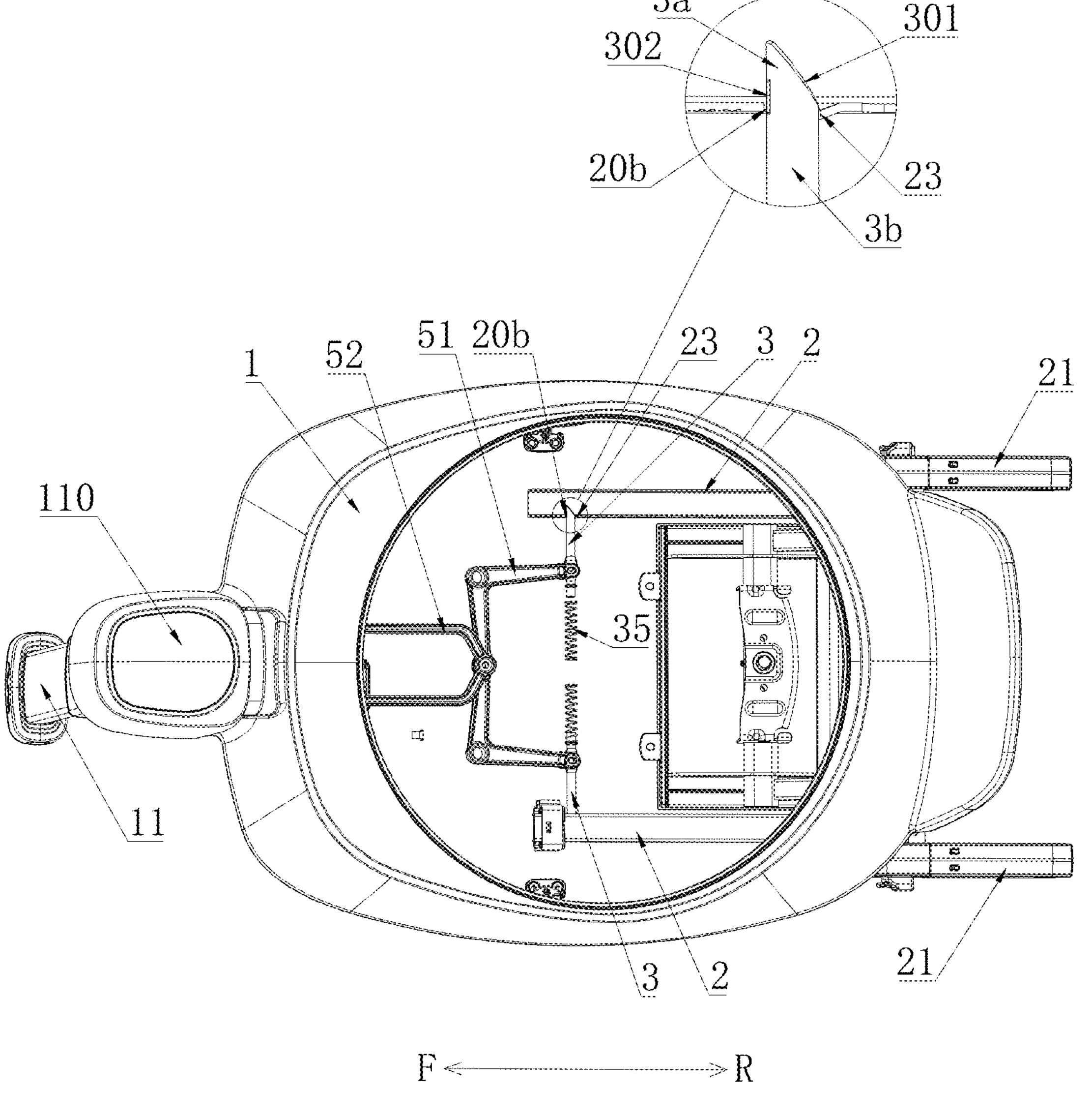
FIG. 4 schematically illustrates a top sectional view of partial structure of the child safety seat according to an embodiment of the present disclosure, to which the extendable and retractable mechanism for the connecting plug shown in FIG. 2 is applied, where, the locking pin is in the locking state and the first end thereof is inserted into a second adjusting concave portion.

Referring to FIG. 2 and FIG. 4, in some embodiments, the plug connecting rack 2 is provided with a first blocking portion 23. The first blocking portion 23 corresponds to the second adjusting concave portion 20*b*, such that when the first end 31 of the locking pin 3 is inserted into the second adjusting concave portion 20*b* (namely when the locking pin 3 is in the second locking state), the first blocking portion 23 cooperates with the cylindrical portion 3*b* of the locking pin 3, thereby preventing the plug connecting rack 2 from retracting and moving forwards relative to the base 1. In this way, when a user is installing the child safety seat onto the vehicle seat, the first end 31 of the locking pin 3 is inserted into the second adjusting concave portion 20*b*, and the exposed length L of the ISOFIX plug remains the longest, thereby preventing the ISOFIX plug from retracting when the ISOFIX plug is inserted into the ISOFIX socket of the vehicle seat, and further avoiding an impossibility of the connection between the ISOFIX plug and the ISOFIX socket due to the retraction of the ISOFIX plug. When the ISOFIX plug engages with the ISOFIX socket, the unlocking mechanism may be operated to urge the locking pin 3 to retract from the second adjusting concave portion 20*b*, and then the unlocking mechanism may be released, and the exposed length (extended length) L of the ISOFIX plug relative to the base 1 may be easily shortened by pushing the base 1 rearwards.

In some embodiments, the first blocking portion 23 is a first protrusion formed at an edge of the second adjusting concave portion 20*b*. The first protrusion may be formed, for example, by processing a wall body of the second adjusting concave portion 20*b*. In other embodiments, the first blocking portion 23 may also be arranged in other manners. For example, a first bump is welded on the plug connecting rack 2, and the first bump serves as the first blocking portion 23.

In some embodiments, by designing a shape and/or a size of the second adjusting concave portion 20*b*, the first blocking portion 23 may not be additionally arranged, and it may also be achieved that when the locking pin 3 is in the second locking state, the locking pin 3 may prevent the plug connecting rack 2 from extending and moving rearwards, and from retracting and moving forwards relative to base 1.

Figure 9:
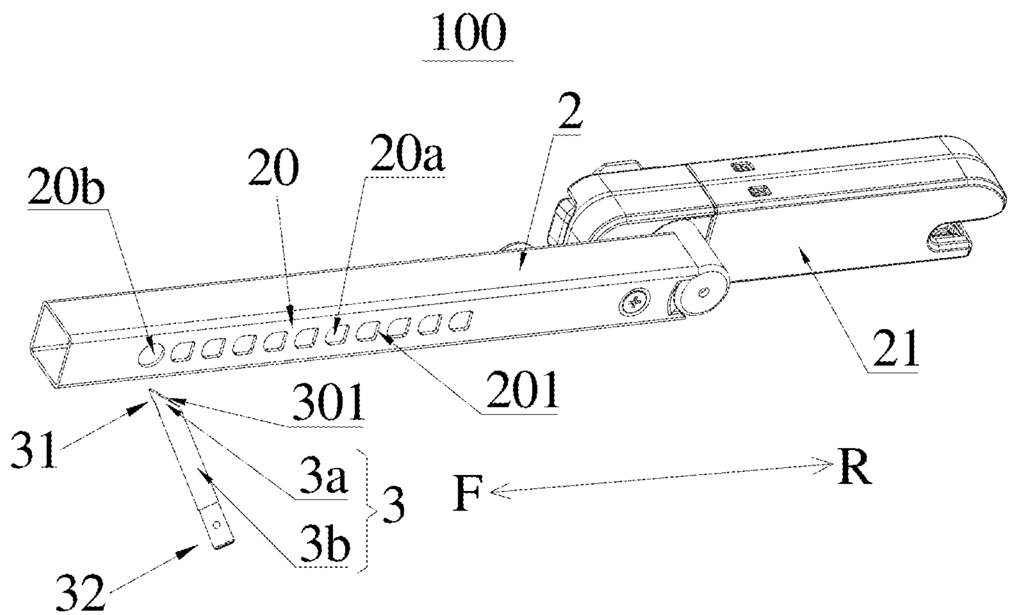
FIG. 9 schematically illustrates a perspective view of the extendable and retractable mechanism for the connecting plug according to yet another embodiment of the present disclosure, where, the locking pin is in the unlocking state.
Figure 10:
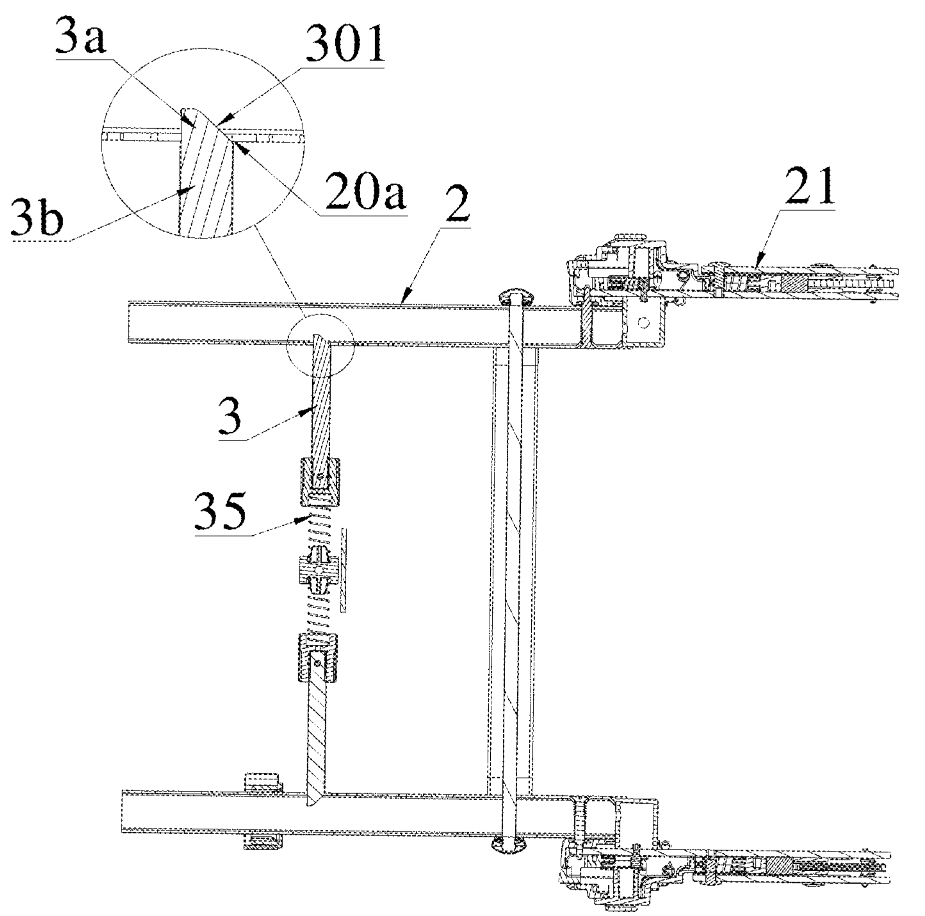
FIG. 10 schematically illustrates a top sectional view of partial structure of the child safety seat according to an embodiment of the present disclosure, to which the extendable and retractable mechanism for the connecting plug shown in FIG. 9 is applied, where, the locking pin is in the locking state, and the first end thereof is inserted into a first adjusting concave portion.
Figure 11:
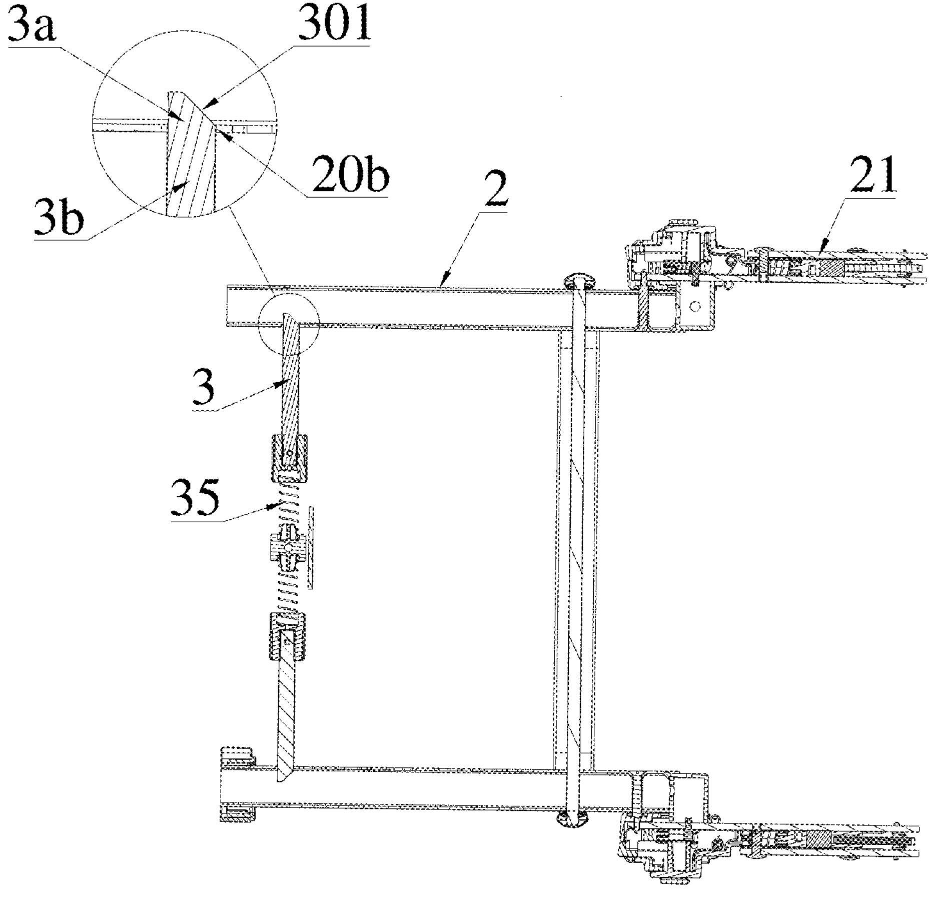
FIG. 11 schematically illustrates a top sectional view of partial structure of the child safety seat according to an embodiment of the present disclosure, to which the extendable and retractable mechanism for the connecting plug shown in FIG. 9 is applied, wherein, the locking pin is in the locking state and the first end thereof is inserted into the second adjusting concave portion.

For example, referring to FIG. 9, the plug connecting rack 2 is a tube. The first adjusting concave portion 20*a* is a hole having a straight edge 201 and a relatively small size, and the second adjusting concave portion 20*b* is configured to be a round hole having a relatively large size. Referring to FIG. 10, when the locking pin 3 is in the first locking state, the slope 301 is in contact with the straight edge 201 of the first adjusting concave portion 20*a* to prevent the locking pin 3 from continuing to extend to the inside of the plug connecting rack 2. At this time, the plug connecting rack 2 is allowed to carry the ISOFIX plug 21 to automatically retract forwards relative to the base, but not allowed to carry the ISOFIX plug 21 to automatically extend rearwards relative to the base. Referring to FIG. 11, when the locking pin 3 is in the second locking state, the edge of the second adjusting concave portion 20*b* does not prevent the locking pin 3 from extending to the inside of the plug connecting rack 2, and the slope 301 passes through the second adjusting concave portion 20*b* and extends to the inside the plug connecting rack 2, and is separated from the edge of the second adjusting concave portion 20*b*. In this case, the cylindrical portion 3*b* of the locking pin 3 may cooperate with the edge of the second adjusting concave portion 20*b*, thereby preventing the plug connecting rack 2 from extending and moving rearwards, and from retracting and moving forwards relative to the base 1.

Figure 12:
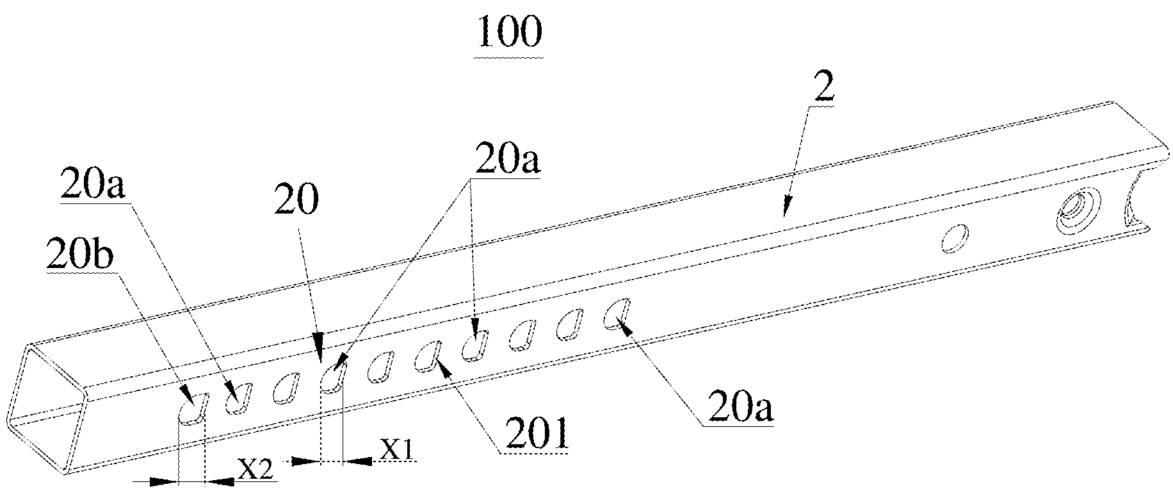
FIG. 12 schematically illustrates a perspective view of a plug connecting rack of the extendable and retractable mechanism for the connecting plug according to yet another embodiment of the present disclosure.

Referring to FIG. 12, in some embodiments, the second adjusting concave portion 20*b* is similar to the first adjusting concave portion 20*a*, and is a hole having a straight edge 201 as well. But in the axial direction of the plug connecting rack 2, a second axial dimension X2 of the second adjusting concave portion 20*b* is larger than a first axial dimension X1 of the first adjusting concave portion 20*a*, such that when the locking pin 3 is in the first locking state, the locking pin 3 can only extend to a position where the slope 301 is in contact with the straight edge 201 of the first adjusting concave portion 20*a*, such that the plug connecting rack 2 may retracts forwards relative to the base 1. When the locking pin 3 is in the second locking state, the locking pin 3 may extend to a position, where the slope 301 of the locking pin 3 completely extends to the inside of the plug connecting rack 2 and is separated from the edge of the second adjusting concave portion 20*b*, such that the plug connecting rack 2 is prevented from extending and moving rearwards, and from retracting and moving forwards relative to the base 1.

Figure 7:
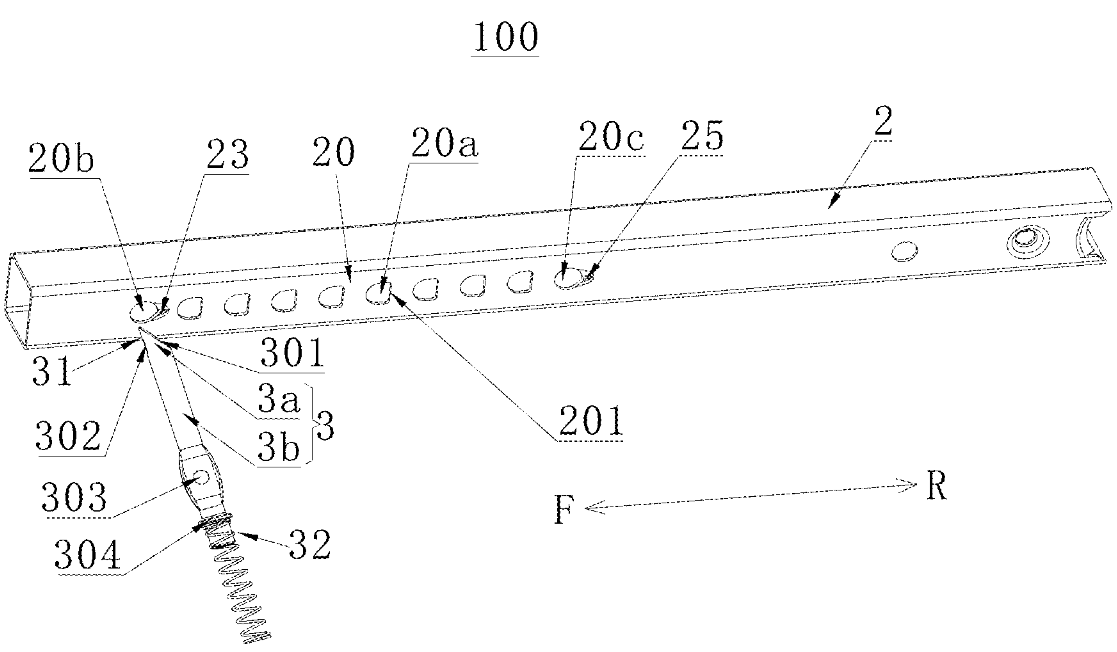
FIG. 7 schematically illustrates a perspective view of the extendable and retractable mechanism for the connecting plug according to another embodiment of the present disclosure, where, the locking pin is in the unlocking state.

Referring to FIG. 7, in some embodiments, the adjusting concave portion 20 further includes a third adjusting concave portion 20*c* located behind the first adjusting concave portion 20*a*. The plug connecting rack 2 is further provided with a second blocking portion 25. The second blocking portion 25 corresponds to the third adjusting concave portion 20*c*. When the first end 31 of the locking pin 3 is inserted into the third adjusting concave portion 20*c* (namely, when the locking pin 3 is in the third locking state), the second blocking portion 25 cooperates with the cylindrical portion 3*b* of the locking pin 3 to prevent the plug connecting rack 2 from continuing to retract and move forwards relative to the base 1, thereby preventing the plug connecting rack 2 from extending and moving rearwards, and from retracting and moving forwards relative to the base 1.

As shown in FIG. 7, when the first end 31 of the locking pin 3 extends into the third adjusting concave portion 20*c*, the exposed length L of the ISOFIX plug reaches the shortest, and the second blocking portion 25 cooperates with the cylindrical portion 3*b* of the locking pin 3 to prevent the plug connecting rack 2 from continuing to retract forwards relative to the base 1, thereby making it convenient for the user to confirm that the ISOFIX plug has retracted to a limit position. The second blocking portion 25 is, for example, a second protrusion formed at an edge of the third adjusting concave portion 20*c*. The second protrusion is formed, for example, by processing a wall body of the third adjusting concave portion 20*c*. In other embodiments, the second blocking portion 25 is arranged in other manners. For example, a second bump is welded on the plug connecting rack 2, and the second bump serves as the second blocking portion 25. In other embodiments, the number of the third adjusting concave portion 20*c* may be set according to actual needs.

Figure 8:
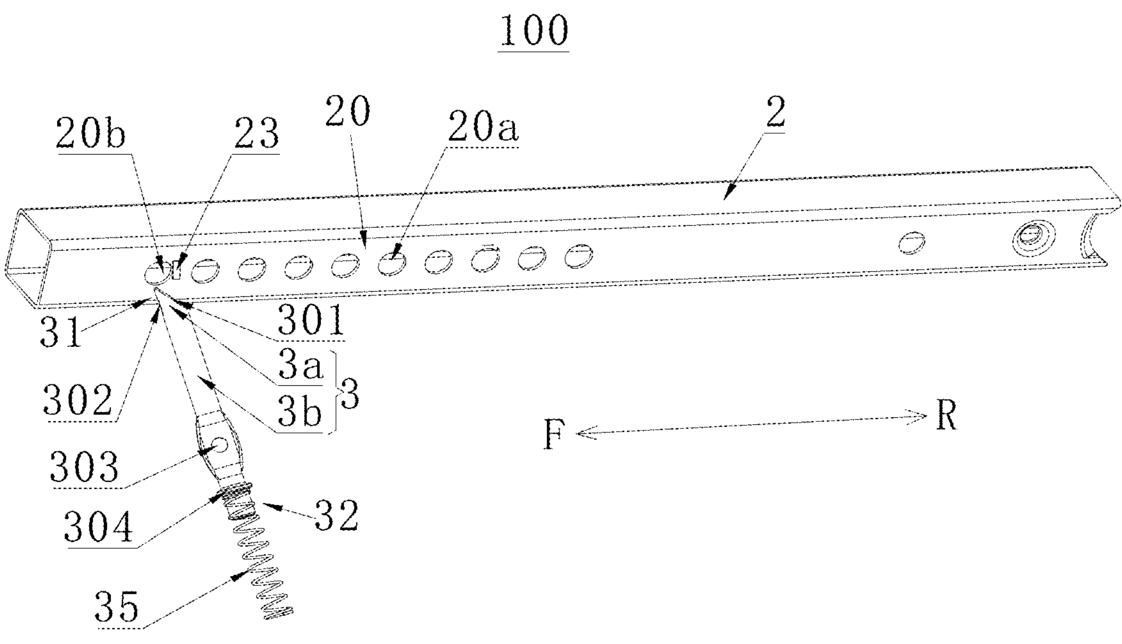
FIG. 8 schematically illustrates a perspective view of the extendable and retractable mechanism for the connecting plug according to yet another embodiment of the present disclosure, where, the locking pin is in the unlocking state.
Figure 13:
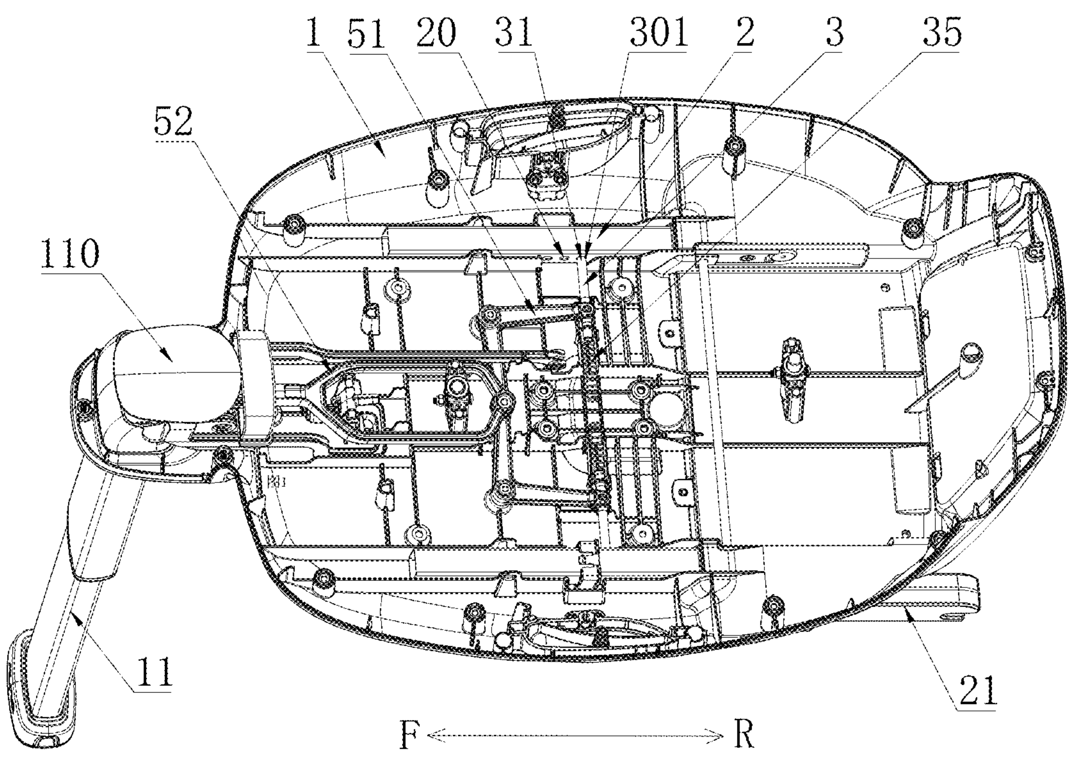
FIG. 13 schematically illustrates a perspective view of partial structure of the child safety seat according to an embodiment of the present disclosure, to which the extendable and retractable mechanism for the connecting plug shown in FIG. 8 is applied.

It should be noted that, the extendable and retractable mechanism 100 provided by the embodiment of the present disclosure may also have various modifications, as long as the first end 31 of the locking pin 3 has the slope 301 adaptable to be in contact with the edge of the first adjusting concave portion 20*a*, so as to allow the plug connecting rack 2 to retract forwards relative to the base 1 to adjust the exposed length L of the ISOFIX plug without operating the unlocking mechanism. For example, referring to FIGS. 8 and 13, in some embodiments, all the first adjusting concave portions 20*a* are round holes with the same structure. Or in some embodiments, all the first adjusting concave portions 20*a* are rectangle-shaped holes, and so on.

The embodiment of the present disclosure also provides a child safety seat, which includes a base 1, the extendable and retractable mechanism for the connecting plug 100 described in the embodiments above, and an unlocking mechanism 5 configured to drive the locking pin 3 to urge the first end 31 of the locking pin 3 to retract from the adjusting concave portion 20.

Figure 14:
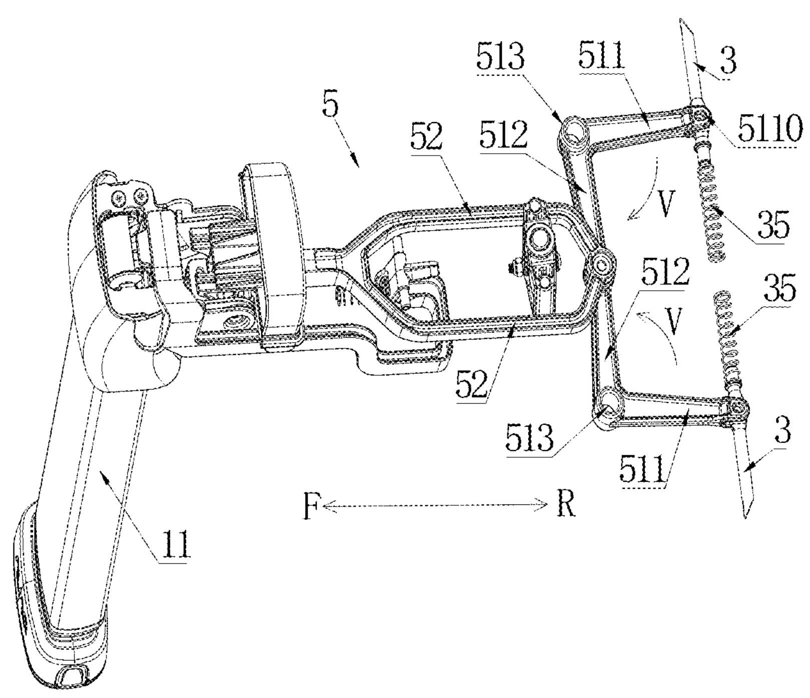
FIG. 14 schematically illustrates a perspective view of partial structure of the child safety seat according to an embodiment of the present disclosure.

Referring to FIGS. 3, 5 and 14, in some embodiments, the unlocking mechanism 5 includes a swing rod 51, a pull handle 52, and a resetting member. The swing rod 51 is L-shaped, and includes a first arm 511, a second arm 512, and a first corner portion 513 arranged between the first arm 511 and the second arm 512. A free end of the first arm 511 and the locking pin 3 are hinged by a connecting bolt 61. The first corner portion 513 and the base 1 are hinged by the pin shaft 62. A free end of the second arm 512 and a rear end of the pull handle 52 are hinged by the pin shaft 63. A front end of the pull handle 52 is, for example, operably connected to an operating member 6. The operating member 6 is, for example, a button arranged on a decorative cover 110. When the operating member 6 is pressed, the operating member 6 may pull the pull handle 52 to move forwards, the pull handle 52 is adaptable to drive the corresponding swing rod 51 to rotate around the pin shaft 62 in a direction indicated by an arrow V through the second arm 512, and the first arm 511 may drive the first end 31 of the locking pin 3 to retract from the adjusting concave portion 20. When the operating member 6 is released, the resetting member may urge the pull handle 52 and the operating member 6 to reset, and then the swing rod 51 resets, and the locking pin 3 resets to the locking position where the first end 31 extends into the corresponding adjusting concave portion 20, that is, the locking pin 3 resets to the first locking state, the second locking state, or the third locking state.

In some embodiments, the resetting member includes a spring 35. In this case, when the operating member 6 is released, the spring 35 drives the locking pin 3 to move to the locking state, and the movement of the locking pin 3 may drive the swing rod 51 to rotate, and the swing rod 51 may drive the pull handle 52 and the operating member 6 to reset.

Referring to FIGS. 2, 3, and 14, in some embodiments, the free end of the first arm 511 is provided with an elongated hole 5110, and an intermediate section of the locking pin 3 is provided with a through hole 303, and the connecting bolt 61 extends into the elongated hole 5110 and the through hole 303, so as to hinge the first arm with the locking pin. In this way, the slidable movement between the connecting bolt 61 and the rectangle-shaped hole 5110 allows a rotation of the swing rod 51 to be transformed into an axial movement of the locking pin 3.

The technical features of the embodiments above may be combined arbitrarily. For the sake of brevity, not all possible combinations of the technical features of the above embodiments are described. However, as long as there is no contradiction between the combinations of these technical features, all combinations of these technical features should be within the scope described in the description.

The embodiments above are only several embodiments of the present disclosure, and the descriptions of the embodiments are specific and detailed, but should not be construed as a limitation on the scope of the present disclosure. It should be noted that, for those of ordinary skill in the art, various modifications and improvements may also be made without departing from the concept of the present disclosure, and these modifications and improvements are all within the protection scope of the present disclosure. Therefore, the protection scope of the present disclosure should be subject to the appended claims.

What is claimed is:

1. An extendable and retractable mechanism for a connecting plug of a child safety seat, the extendable and retractable mechanism comprising:

a plug connecting rack arranged slidably back and forth in a sliding direction on a base of the child safety seat, the plug connecting rack comprising a plurality of first adjusting concave portions, and the plurality of first adjusting concave portions being arranged in sequence along the sliding direction of the plug connecting rack; and a locking pin movably supported to allow the locking pin to be kept in a first locking state in that a first end of the locking pin extends into any one of the plurality of first adjusting concave portions, the first end of the locking pin having a slope facing rearwards in the sliding direction, and a locking slot positioned forward of the slope in the sliding direction;

wherein, when the locking pin is in the first locking state, the slope is in contact with an edge of the any one of the plurality of first adjusting concave portions and part of a wall of the plug connecting rack located at the any one of the plurality of first adjusting concave portions is locked in the locking slot.

2. The extendable and retractable mechanism for the connecting plug according to claim 1, wherein each of the plurality of first adjusting concave portions has a straight edge configured to be in contact with the slope.

3. The extendable and retractable mechanism for the connecting plug according to claim 1, wherein:

the plug connecting rack is a tube; and the wall of the plug connecting rack is a tube wall.

4. The extendable and retractable mechanism for the connecting plug according to claim 1, wherein:

the plug connecting rack further comprises at least one second adjusting concave portion, and the at least one second adjusting concave portion is located in front of the plurality of first adjusting concave portions;

the locking pin has a second locking state in that the first end of the locking pin extends into the second adjusting concave portion; and when the locking pin is in the second locking state, the locking pin is configured to prevent the plug connecting rack from extending and moving rearwards, and from retracting and moving forwards relative to the base.

5. The extendable and retractable mechanism for the connecting plug according to claim 4, wherein:

the plug connecting rack is further provided with at least one blocking portion corresponding to the at least one second adjusting concave portion; and the locking pin comprises a lock tongue and a cylindrical portion connected to each other; wherein the lock tongue is arranged at the first end of the locking pin, the slope is formed on the lock tongue, and the cylindrical portion is adaptable to cooperate with the at least one blocking portion to prevent the plug connecting rack from retracting and moving forwards relative to the base.

6. The extendable and retractable mechanism for the connecting plug according to claim 5, wherein the at least one blocking portion is a protrusion formed at an edge of the second adjusting concave portion.

7. The extendable and retractable mechanism for the connecting plug according to claim 4, wherein:

the plug connecting rack is a tube; and the second adjusting concave portion is configured such that when the locking pin is in the second locking state, the slope passes through the second adjusting concave portion and extends to an inside of the plug connecting rack, and is separated from an edge of the second adjusting concave portion.

8. The extendable and retractable mechanism for the connecting plug according to claim 1, wherein:

the plug connecting rack further comprises at least one adjusting concave structure, and the at least one adjusting concave structure is located behind the plurality of first adjusting concave portions;

the locking pin has a locking state in that the first end of the locking pin extends into the adjusting concave structure; and when the locking pin is in the locking state, the locking pin is configured to prevent the plug connecting rack from extending and moving rearwards, and from retracting and moving forwards relative to the base.

9. The extendable and retractable mechanism for the connecting plug according to claim 8, wherein:

the plug connecting rack is further provided with at least one blocking part corresponding to the at least one adjusting concave structure;

the locking pin comprises a lock tongue and a cylindrical portion connected to each other;

the lock tongue is arranged at the first end of the locking pin;

the slope is formed on the lock tongue; and the cylindrical portion is adaptable to cooperate with the at least one blocking part to prevent the plug connecting rack from retracting and moving forwards relative to the base.

10. The extendable and retractable mechanism for the connecting plug according to claim 9, wherein the at least one blocking part is a protrusion formed at an edge of the at least one adjusting concave structure.

11. The extendable and retractable mechanism for the connecting plug according to claim 1, wherein:

the any one of the plurality of first adjusting concave portions is a hole or a slot; or the connecting plug is installed at a rear end of the plug connecting rack.

12. A child safety seat, comprising a base, the extendable and retractable mechanism for the connecting plug according to claim 1, and an unlocking mechanism configured to drive the locking pin to urge the first end of the locking pin to retract from any one of the plurality of first adjusting concave portions.

13. The child safety seat of claim 12, wherein:

the unlocking mechanism comprises a swing rod, a pull handle, a resetting member, and an operating member;

the swing rod comprises a first arm, a second arm, and a first corner portion arranged between the first arm and the second arm; wherein a free end of the first arm and the locking pin are hinged, the first corner portion and the base are hinged, and a free end of the second arm and a rear end of the pull handle are hinged;

a front end of the pull handle is operably connected to the operating member;

the operating member is adaptable to pull the pull handle to urge the swing rod to drive the first end of the locking pin to retract from the any one of the plurality of first adjusting concave portions; and the resetting member is configured to urge the pull handle to reset, and configured to urge the locking pin to reset to the first locking state.

14. The child safety seat according to claim 13, wherein:

the free end of the first arm is provided with an elongated hole, and an intermediate section of the locking pin is provided with a through hole; and a connecting bolt extends into the elongated hole and the through hole to hinge the first arm with the locking pin.

* * * * *